(12) United States Patent
Izutani et al.

(10) Patent No.: US 8,473,161 B2
(45) Date of Patent: Jun. 25, 2013

(54) ELECTRIC POWER STEERING APPARATUS

(75) Inventors: Keisuke Izutani, Yamatotakada (JP); Hiroshi Kawamura, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 238 days.

(21) Appl. No.: 12/989,187

(22) PCT Filed: Jun. 10, 2009

(86) PCT No.: PCT/JP2009/060619
§ 371 (c)(1),
(2), (4) Date: Oct. 22, 2010

(87) PCT Pub. No.: WO2009/154119
PCT Pub. Date: Dec. 23, 2009

(65) Prior Publication Data
US 2011/0040450 A1    Feb. 17, 2011

(30) Foreign Application Priority Data

Jun. 16, 2008 (JP) ................................ 2008-156591
Nov. 11, 2008 (JP) ................................ 2008-289144

(51) Int. Cl.
*A01B 69/00* (2006.01)
*B62D 6/00* (2006.01)
*B63G 8/20* (2006.01)

(52) U.S. Cl.
USPC ................... 701/43; 701/41; 701/42; 180/446

(58) Field of Classification Search
USPC .................. 701/41–44; 180/446; 318/489
See application file for complete search history.

(56) References Cited

U.S. PATENT DOCUMENTS

| | | | | |
|---|---|---|---|---|
| 6,032,091 | A | * | 2/2000 | Noro et al. ................... 701/42 |
| 6,068,078 | A | * | 5/2000 | Rau et al. ................... 180/446 |
| 7,203,583 | B2 | * | 4/2007 | Fujimoto et al. ............ 701/41 |

FOREIGN PATENT DOCUMENTS

| | | |
|---|---|---|
| JP | A-11-034892 | 2/1999 |
| JP | A-2000-233763 | 8/2000 |
| JP | A-2001-171540 | 6/2001 |
| JP | A-2005-007991 | 1/2005 |
| JP | A-2005-067414 | 3/2005 |
| JP | A-2005-193751 | 7/2005 |
| JP | A-2005-297748 | 10/2005 |

(Continued)

OTHER PUBLICATIONS

International Search Report issued in Application No. PCT/JP2009/060619; Dated Sep. 29, 2010.

*Primary Examiner* — Thomas Tarcza
*Assistant Examiner* — Tyler J Lee
(74) *Attorney, Agent, or Firm* — Oliff & Berridge, PLC

(57) ABSTRACT

An electric power steering apparatus drives a motor to generate a steering assist force according to a steering torque and includes an output circuit for supplying the motor with electric power from at least one of a battery and an auxiliary power supply. The electric power steering apparatus has a control circuit which at or after detection of a breakdown of the battery, determines a length of time to the end of steering assist (decreasing time t1) based on the amount of energy stored in the auxiliary power supplies and which takes the determined length of time to perform output decreasing control to gradually decrease the upper limit of power supplied for the steering assist to practically zero according to a constant gradient. Thus is provided an electric power steering apparatus which is adapted to prevent a sudden fall of the steering assist force in the event of a battery breakdown while effectively utilizing the available stored energy.

4 Claims, 8 Drawing Sheets

FOREIGN PATENT DOCUMENTS

| | | |
|---|---|---|
| JP | A-2007-001324 | 1/2007 |
| JP | A-2007-112319 | 5/2007 |
| JP | A-2007-153107 | 6/2007 |
| JP | A-2008-062712 | 3/2008 |

* cited by examiner (a)

(b)

(c)

ELECTRIC POWER STEERING APPARATUS

TECHNICAL FIELD

The present invention relates to an electric power steering apparatus which drives a motor to generate a steering assist force according to a steering torque applied by a driver.

BACKGROUND ART

The electric power steering apparatus is a machine which drives the motor to generate the steering assist force according to the steering torque applied by the driver. Recently, such electric power steering apparatus have been faced with a demand to operate on bulk power. To meet this demand, an electric power steering apparatus has been proposed in which an auxiliary power supply (capacitor) independent from a battery is connected in series with the battery as needed so that a large amount of power may be supplied at high voltage (see, for example, Patent Document 1). By the way, if the battery breaks down (fails), the electric power steering apparatus suddenly fails to fulfill its steering assist function. For the sake of improvement of reliability, therefore, there has also been suggested potential for using the auxiliary power supply as a backup power source such as to ensure that the battery breakdown does not entail sudden loss of the steering assist force.

In a case where the auxiliary power supply is used as the backup power source, a control source voltage ($V_{cc}$) is also supplied from the auxiliary power supply. Therefore, the auxiliary power supply must save such an amount of charge as to be able to maintain the control source voltage even though the auxiliary power supply is designed to supply the stored energy to the motor of the electric power steering apparatus. Namely, the auxiliary power supply has a lower voltage limit at which the auxiliary power supply reaches a power discharge limit. If the motor freely draws power from the auxiliary power supply to the power discharge limit, the discharge ends as soon as the auxiliary power supply reaches the power discharge limit. This results in the sudden loss of the steering assist force. In this case, the driver experiences a feeling of strangeness associated with an abrupt increase in steering load.

CITATION LIST

Patent Literature

Patent Document 1 Japanese Unexamined Patent Publication No. 2008-62712 (FIG. 1, Paragraph [0036])

SUMMARY OF THE INVENTION

In view of the existing problem in the art, an object of the invention is to provide an electric power steering apparatus which, in the event of a battery breakdown, prevents a sudden fall of the steering assist force while effectively utilizing available stored energy.

[1] According to a first aspect of the invention, an electric power steering apparatus driving a motor to generate a steering assist force according to a steering torque, comprising: a battery for supplying electric power to the motor; an auxiliary power supply charged by the battery and capable of supplying electric power to the motor; an output circuit for supplying the motor with electric power from at least one of the battery and the auxiliary power supply; a breakdown detector for detecting a breakdown of the battery; and a control circuit which, in the event of a battery breakdown detected by the breakdown detector, uses the stored energy of the auxiliary power supply for steering assist and performs output decreasing control to gradually decrease the upper limit of the power supplied for the steering assist according to a length of time elapsed.

In a case where the battery breakdown is detected, the electric power steering apparatus of the first aspect can provide the steering assist by using the auxiliary power supply. Further, the steering system can also prevent the sudden fall of the steering assist force by gradually decreasing the upper limit of the power supplied for the steering assist according to the length of time elapsed. Such an electric power steering apparatus provides an electric power steering apparatus adapted to prevent the sudden fall of the steering assist force while effectively utilizing the energy stored in the auxiliary power supply.

[2] According to a second aspect of the invention, the electric power steering apparatus of the first aspect may be arranged such that at or after the battery breakdown detected by the breakdown detector, the control circuit determines a length of time to the end of the steering assist based on the amount of energy stored in the auxiliary power supply and performs the output decreasing control till the length of time has elapsed, the output decreasing control being defined as that the upper limit of the power supplied for the steering assist is gradually decreased to practically zero according to a constant gradient.

According to the electric power steering apparatus of the second aspect, the length of time to the end of the steering assist is determined based on the amount of energy stored in the auxiliary power supply when or after the battery breakdown is detected. Hence, the length of time also varies according to the amount of stored energy. The steering system takes this length of time to gradually decrease the upper limit of the power supplied for the steering assist to practically zero according to the constant gradient, thereby ensuring that the steering assist is provided till the supply power is reduced to zero. Thus, the end of steering assist coincides with the timing of the steering assist force being reduced to zero.

[3] According to a third aspect of the invention, the electric power steering apparatus of the first aspect may be arranged such that when a steering torque of at least a predetermined value is first applied at or after the battery breakdown detected by the breakdown detector, the control circuit determines a length of time to the end of the steering assist based on the amount of energy stored in the auxiliary power supply and performs the output decreasing control till the length of time has elapsed, the output decreasing control being defined as that the upper limit of the power supplied for the steering assist is gradually decreased to practically zero according to a constant gradient.

According to the electric power steering apparatus of the third aspect, the control circuit does not start the output decreasing control at the mere detection of the battery breakdown. The control circuit starts the output decreasing control only after the application of the steering torque of at least the predetermined value, which follows the detection of the battery breakdown. In other words, the steering system does not encounter a phenomenon after the battery breakdown that the upper limit of the supply power (steering assist force) is already decreased although no steering operation was done. When the driver performs the first steering operation after the battery breakdown, therefore, the steering system can prevent the driver from experiencing the feeling of strangeness associated with the sudden fall of the steering assist force.

[4] According to a fourth aspect of the invention, the electric power steering apparatus of the first aspect may be arranged such that the control circuit performs the output decreasing control when the amount of energy stored in the auxiliary power supply falls below a threshold value at or after the battery breakdown detected by the breakdown detector, the output decreasing control being defined as that the upper limit of the power supplied for the steering assist is gradually decreased according to the length of time elapsed.

After the detection of the battery breakdown, the electric power steering apparatus of the fourth aspect can provide the steering assist by using the auxiliary power supply. The upper limit of the supply power at this time is not limited if the energy stored in the auxiliary power supply is equal to or more than the threshold value. After the stored energy is decreased to below the threshold value, the upper limit of the supply power is gradually decreased according to the length of time elapsed.

MODES FOR CARRYING OUT THE INVENTION

Figure 1:
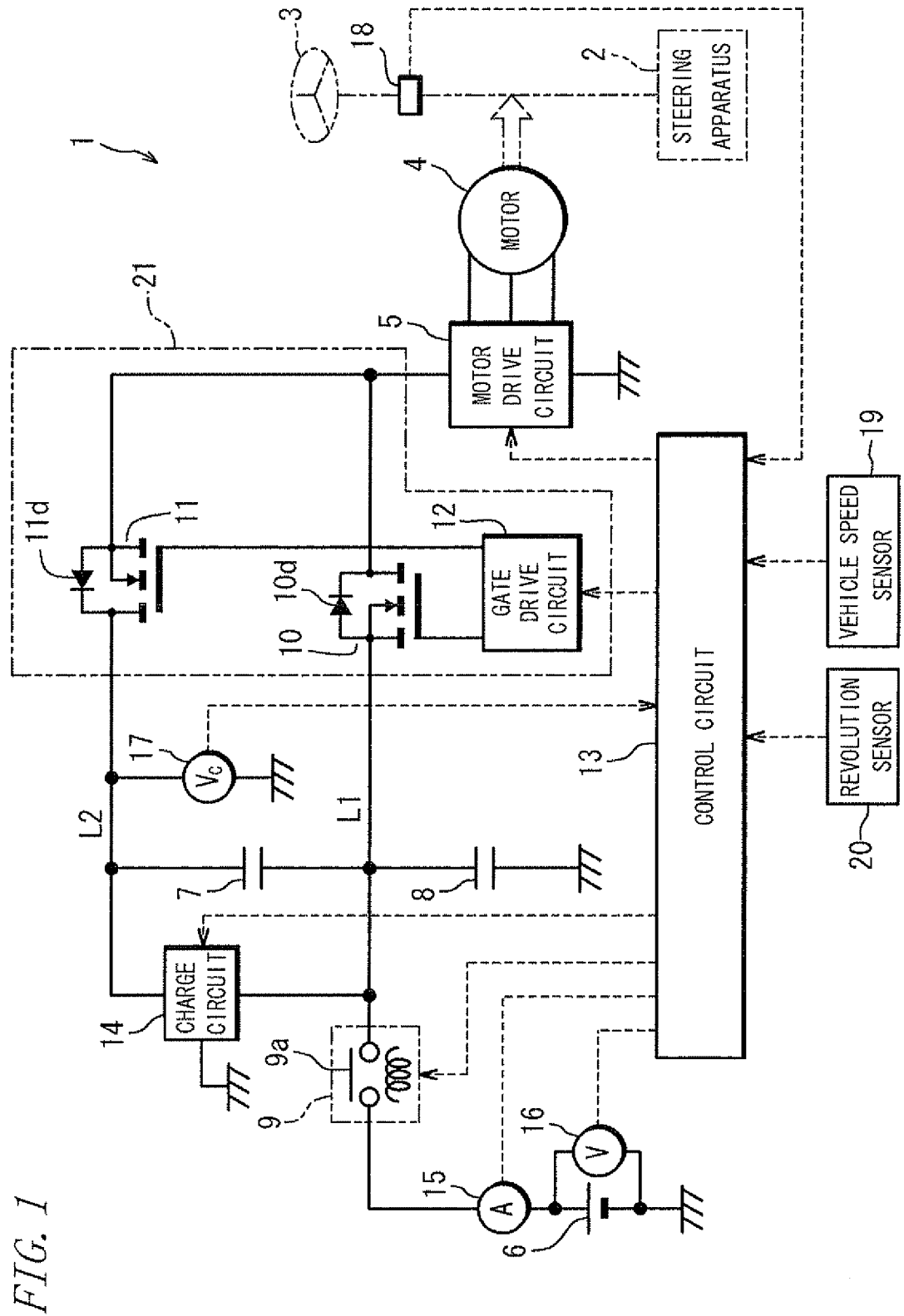
FIG. 1 is a circuit diagram principally showing an electric circuit of a general arrangement of an electric power steering apparatus according to a first embodiment of the present invention.

FIG. 1 is a circuit diagram principally showing an electric circuit of a general arrangement of an electric power steering apparatus 1 according to a first embodiment of the invention. Referring to the figure, a steering apparatus 2 is driven by a steering torque applied by a driver to a steering wheel 3 and a steering assist force generated by a motor 4. The motor 4 is a three-phase brushless motor which is driven by a motor drive circuit 5. The motor drive circuit 5 is supplied with voltage from a battery 6 or from a power source including an auxiliary power supply 7 connected in series with the battery 6. The auxiliary power supply 7 comprises an electric double-layer capacitor. Another auxiliary power supply 8 is in parallel connection with the battery 6 so as to serve as a backup power source and is also in serial connection with the auxiliary power supply 7. The auxiliary power supply 8 also comprises an electric double-layer capacitor.

The voltage of the battery 6 is conducted to the motor drive circuit 5 and the motor 4 via an electrical conduction path L1 in which a contact 9$a$ of a source relay 9 and a MOS-FET 10 are interposed. The MOS-FET 10 is an N-channel device which is connected in such a manner that a source thereof is connected to the battery 6 and a drain thereof is connected to the motor drive circuit 5. A parasitic diode 10$d$ is so configured as to pass current in the forward direction when electric power from the battery 6 is supplied to the motor 4.

The auxiliary power supply 7 is disposed between the electrical conduction path L1 and another electrical conduction path L2. The electrical conduction path L2 on a high-potential side of the auxiliary power supply 7 is connected to the motor drive circuit 5 via a MOS-FET 11. The MOS-FET 11 is an N-channel device which is connected in such a manner that a source thereof is connected to the motor drive circuit 5 and a drain thereof is connected to the auxiliary power supply 7. A parasitic diode 11$d$ is oriented in a direction reverse to a direction in which current flows when the electric power is supplied from the auxiliary power supply 7 to the motor 4.

The above two MOS-FETs 10 and 11 are driven by a gate drive circuit (FET driver) 12 in such a manner that these MOS-FETs are alternately turned on. An output circuit 21, which comprises these two MOS-FETs 10 and 11 and the gate drive circuit 12, supplies the electric power from the battery 6 to the motor 4 when the MOS-FET 10 is on. When the MOS-FET 11 is on, the output circuit 21 supplies to the motor 4 the electric power from a series combination of the battery 6 and the auxiliary power supply 7. In spite of breakdown (failure) of the battery 6, the output circuit 21 can supply to the motor 4 the electric power from a series combination of the auxiliary power supplies 7 and 8 when the MOS-FET 11 is on. Namely, the output circuit 21 configures a circuit which supplies the motor 4 with the electric power from at least one of the battery 6 and the auxiliary power supply 7 and 8.

The above-described gate drive circuit 12 and the aforementioned motor drive circuit 5 are controlled by a control circuit 13 including CPU, memory, interface and the like.

On the other hand, a charge circuit 14 is disposed between the electrical conduction path L1 and the electrical conduction path L2. The charge circuit 14 operates to raise the voltage from the battery 6 and to apply the raised voltage between terminals of the auxiliary power supply 7. Charging timing is controlled by the control circuit 13.

A current detector 15 connected in series with the battery 6 detects an output current from the battery 6 and sends its detection signal to the control circuit 13. A voltage drop attributed to the current detector 15 is so small as to be negligible. A voltage detector 16 connected in parallel with the battery 6 detects a terminal-to-terminal voltage of the battery 6 and sends its detection signal to the control circuit 13.

On the other hand, a voltage detector 17 connected between the electrical conduction path L2 and a grounded conduction path detects a voltage $V_c$ of the electrical conduction path L2 and sends its detection signal to the control circuit 13. When the contact 9$a$ of the source relay 9 is closed, a potential at the electrical conduction path L2 is a sum of a terminal-to-terminal voltage of the battery 6 (or a terminal-to-terminal voltage of the auxiliary power supply 8) and a terminal-to-terminal voltage of the auxiliary power supply 7. When the contact 9$a$ is open, a potential at the electrical conduction path L2 is a sum of the terminal-to-terminal voltage of the auxiliary power supply 7 and the terminal-to-terminal voltage of the auxiliary power supply 8.

Inputted to the control circuit 13 are an output signal from a torque sensor 18 for detecting a steering torque applied to the steering wheel 3; an output signal from a vehicle speed sensor 19 for detecting a vehicle speed; and an output signal from a revolution sensor 20 for detecting engine revolutions.

Although not shown in the figure, the battery 6 provides a control source voltage ($V_{cc}$: e.g., 5V) of the control circuit 13 and other control source voltages (hereinafter, simply referred to as "the control source voltage"). It is also possible to provide the control source voltage via the electrical conduction path L2 when the battery 6 is broken. The control circuit 13 incorporates therein a voltage limiter function, for example, so as to be able to receive a relatively wide range of voltages.

The electric power steering apparatus 1 of the above-described arrangement is activated by turning on an ignition key (not shown) and the resultant rise of engine speed. In response to a command signal from the control circuit 13, the source relay 9 is turned on (contacts are closed). Based on the steering torque and vehicle speed, the control circuit 13 drives the motor drive circuit 5 in a manner such that an electric power required for generating a required steering assist force is supplied to the motor 4. If the required electric power is equal to or less than a reference value, the control circuit 13 outputs command signals to turn on the MOS-FET 10 and to turn off the MOS-FET 11 so that the voltage of the battery 6 is conducted to the motor drive circuit 5.

The auxiliary power supply 7 is charged by the charge circuit 14. The charging operation is performed when, for example, the torque sensor 18 is not detecting the steering torque.

On the other hand, if the required electric power is more than the reference value, namely the battery 6 alone cannot satisfy a demand for the required electric power, the control circuit 13 turns off the MOS-FET 10 and turns on the MOS-FET 11. As a result, an output voltage from the battery 6 and the auxiliary power supply 7, which are interconnected in series, is supplied to the motor drive circuit 5. Thus, a high power beyond the output capacity of the battery 6 alone can be supplied to the motor 4. At this time, a cathode potential of the parasitic diode 10d of the MOS-FET 10 is higher than an anode potential thereof. That is, the parasitic diode 10d is subject to reverse voltage, preventing the auxiliary power supply 7 from producing the current flowing into the electrical conduction path L1.

Figure 2:
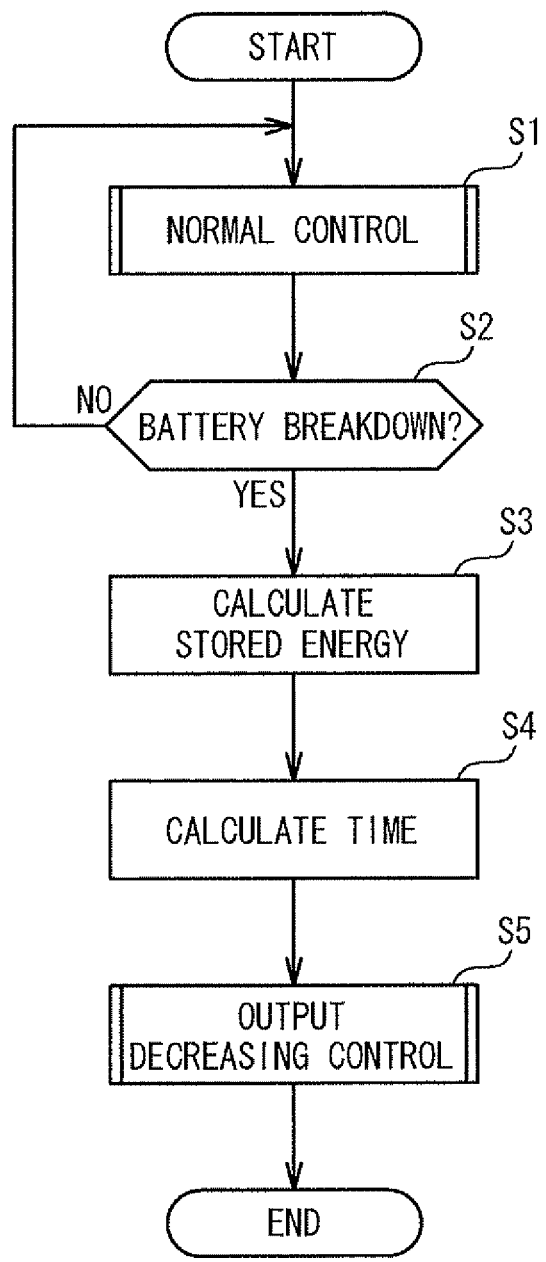
FIG. 2 is a flow chart showing the steps of a control operation of the electric power steering apparatus according to the first embodiment hereof.

FIG. 2 is a flow chart showing the steps of a control operation of the electric power steering apparatus 1 according to the first embodiment of the invention.

Now, description is made on an operation performed in the event of a battery breakdown with reference to the flow chart of FIG. 2. Referring to the figure, the control circuit 13 repeats the aforementioned normal control operation till the breakdown (failure) of the battery 6 is detected (Steps S1, S2). The breakdown of the battery 6 can be detected by a zero output current from the battery 6 in spite of the active motor drive circuit 5 as detected by the current detector 15, or by a sudden fall of the terminal-to-terminal voltage of the battery 6 as detected by the voltage detector 16. Namely, the current detector 15 and/or the voltage detector 16 are capable of detecting the change in voltage or current caused by the breakdown of the battery 6. The current detector 15 and voltage detector 16, together with the control circuit 13, constitute a breakdown detector for detecting the breakdown of the battery 6.

In a case where the breakdown of the battery 6 is detected by the control circuit 13 in Step S2, the control circuit 13 calculates a stored energy (Step S3). Specifically, the capacitance C (constant) of a series combination of the two auxiliary power supplies 7 and (hereinafter, referred to as "series capacitor combination") is calculated by the following equation:

$$C=(C7 \cdot C8)/(C7+C8),$$

where C7 denotes the capacitance of the auxiliary power supply 7, and C8 denotes the capacitance of the auxiliary power supply 8.

The energy E that is stored in and available from the series capacitor combination is calculated by the following equation:

$$E=(C/2) \cdot (V1^2 - V2^2) \qquad (1),$$

where V1 (variable) denotes the initial value of the voltage $V_c$ at breakdown detection, and V2 (constant) denotes the lower voltage limit (power discharge limit) of the series capacitor combination. The lower voltage limit V2 is set at a value equal to or more than the control source voltage (e.g., 5V) for the sake of supplying the control source voltage.

Figure 3:
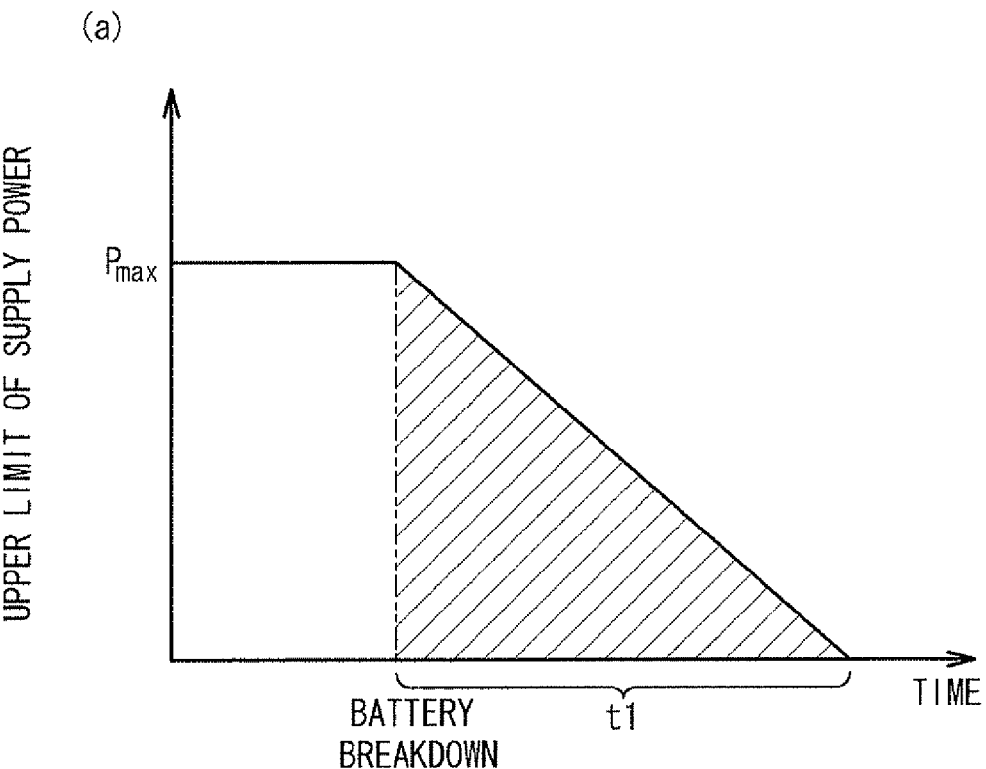
FIG. 3($a$) is a graph showing the time-varying upper limit of supply power according to the first embodiment hereof, and FIG. 3($b$) is a graph showing how the supply power, with restriction by the upper limit, decreases during steering operation.
Figure 3:
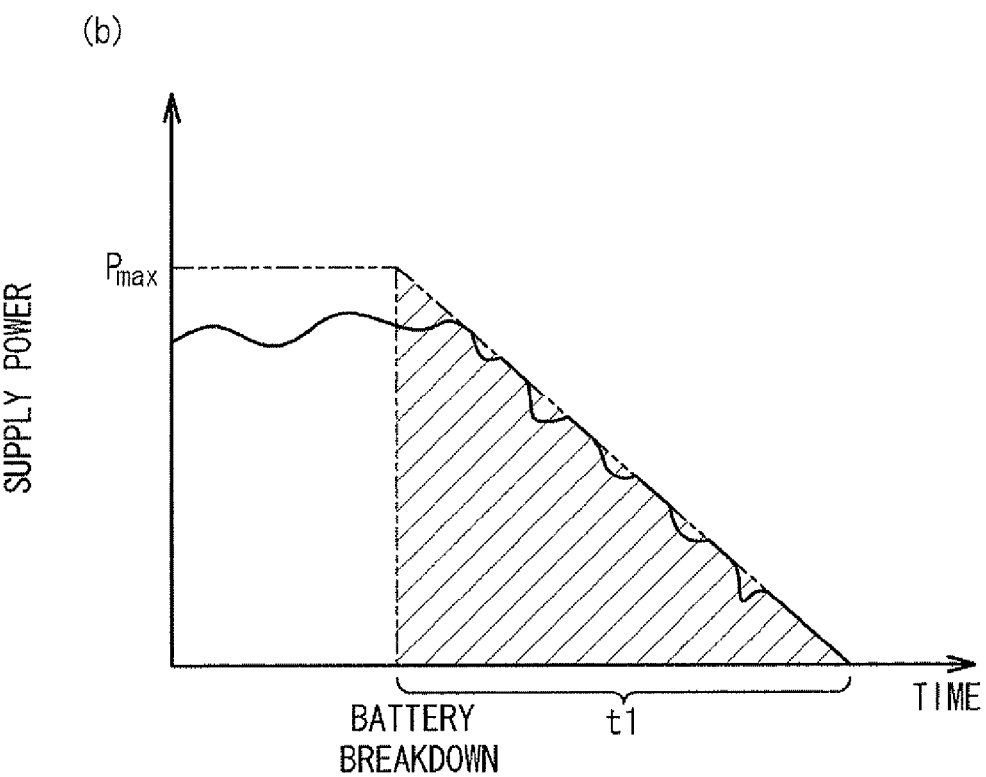

On the other hand, specifications of the electric power steering apparatus 1 define the maximum power to be supplied to the motor 4. Hence, the available stored energy E is also defined as:

$$E=P_{max} \cdot t1/2 \qquad (2),$$

where $P_{max}$[W] denotes the maximum power (constant), and t1 [second] denotes the time in which the upper limit of supply power is gradually decreased according to a constant gradient (hereinafter, referred to as "decreasing time"). FIG. 3(*a*) is a graph showing the time-varying upper limit of supply power. The equation (2) indicates that the stored energy E is represented by the cross-hatched area in FIG. 3(*a*).

The decreasing time t1 can be calculated from the following equation obtained by combining the above equations (1) and (2):

$$t1=2E/P_{max}=(C/P_{max})(V1^2-V2^2) \qquad (3)$$

The control circuit 13 calculates a decreasing time t1 according to the equation (3) (Step S4). Subsequently, the control circuit 13 carries out output decreasing control (Step S5). Specifically, the control circuit 13 provides control of steering assist (assist control) by turning on the MOS-FET 11 (turning off the MOS-FET 10) and turning off the source relay 9. It is noted that restriction is imposed on the supply power, so that the upper limit thereof is gradually decreased. Namely, the upper limit P of the supply power is gradually decreased according to the constant gradient such as to establish the following equation:

$$P=P_{max}-(P_{max}t1) \cdot t \qquad (4),$$

where t ($\leq$t1) denotes the length of time that has elapsed since battery breakdown. Accordingly, when t=t1, the supply power is practically zero, i.e. P=0. FIG. 3 (*b*) is a graph showing how such output decreasing control reduces the supply power (solid line), with restriction of the upper limit, during steering operation.

According to the electric power steering apparatus 1 of the first embodiment as described above, the decreasing time t1 to the end of steering assist is determined based on the energy stored in the auxiliary power supplies 7 and 8 when the breakdown of the battery 6 is detected. Hence, the decreasing time also varies according to the amount of stored energy. The steering system takes the decreasing time t1 to reduce the upper limit of the power supplied for steering assist to practically zero according to the constant gradient thereby ensuring that the steering assist is provided till the supply power falls to zero. Therefore, the end of steering assist coincides with the timing of the steering assist force being reduced to zero. Thus is provided the electric power steering apparatus which is adapted to prevent the sudden fall of the steering assist force while effectively utilizing the available stored energy.

Figure 4:
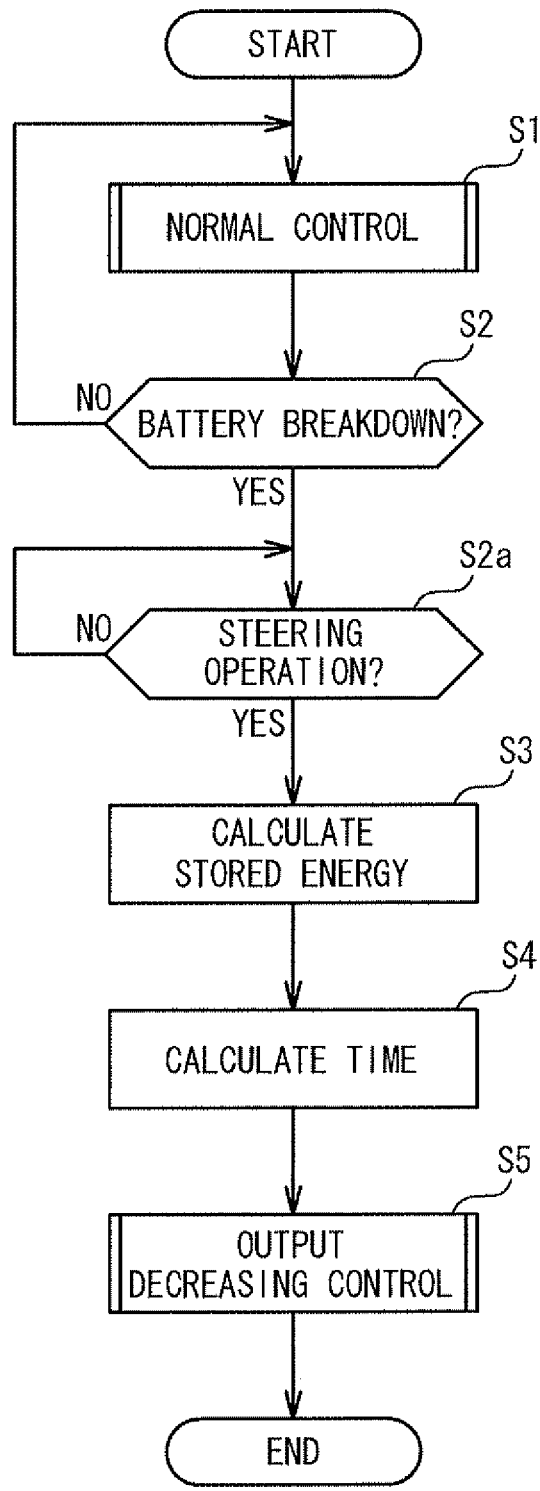
FIG. 4 is a flow chart showing the steps of a control operation of an electric power steering apparatus according to a second embodiment hereof.

FIG. 4 is a flow chart showing the steps of a control operation of an electric power steering apparatus according to a second embodiment. A circuit configuration of this embodiment is the same as that of the first embodiment. A difference from the control operation shown in FIG. 2 consists in that a step S2a is interposed between Steps S2 and S3. The operations of the other steps are the same as those of the first embodiment.

The operation of the flow chart is performed as follows. When the breakdown of the battery 6 is detected in Step S2, the control circuit 13 does not carry out the output decreasing control immediately but waits for the steering operation to be performed (Step S2a). Whether the steering operation is performed or not is determined based on a steering torque signal from the torque sensor 18 and on whether a steering torque of at least a predetermined value is detected or not. Besides the steering torque signal, a drive current command applied to the motor drive circuit 5 or an actual current through the motor 4 may also be used for indirect detection of the steering operation.

Figure 5:
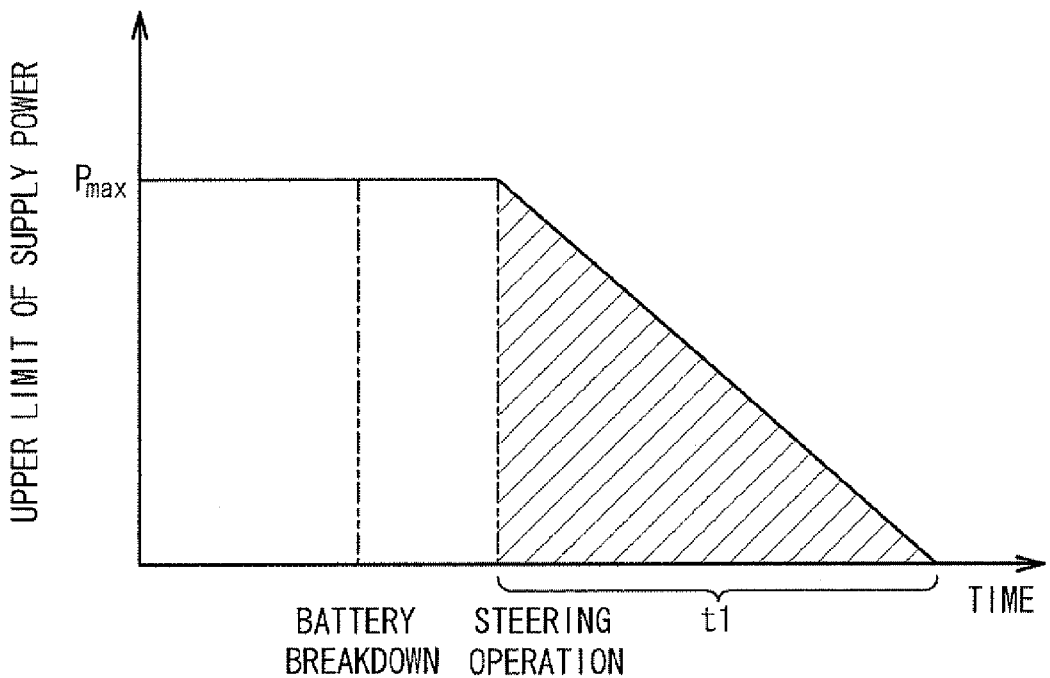
FIG. 5($a$) is a graph showing the time-varying upper limit of supply power according to the second embodiment hereof, and FIG. 5($b$) is a graph showing how the supply power, with restriction by the upper limit, decreases during steering operation.
Figure 5:
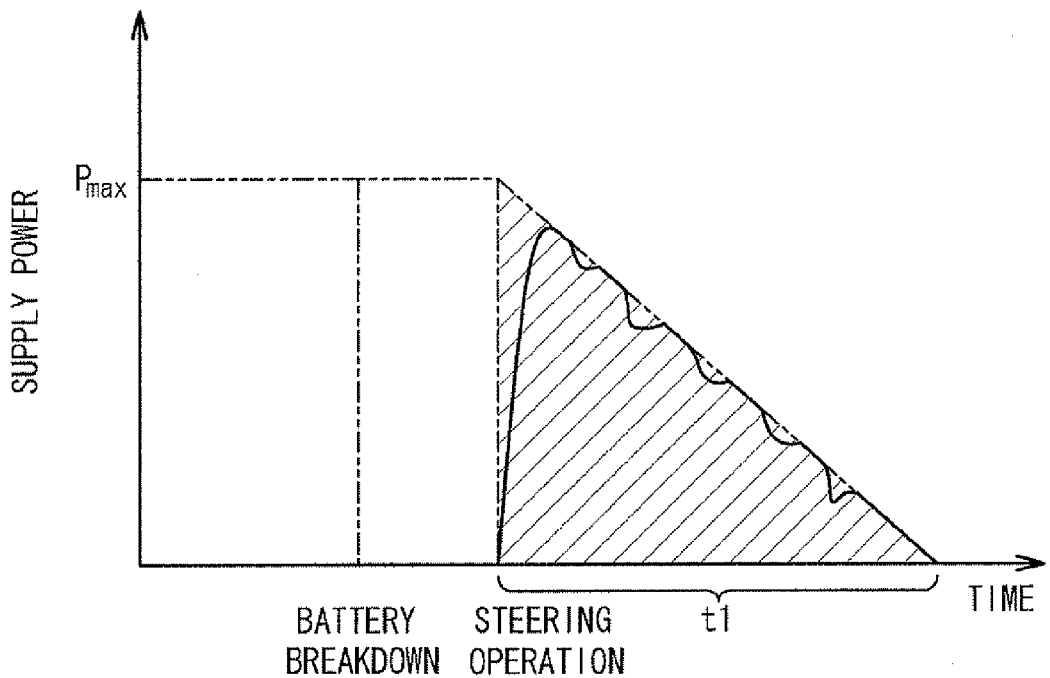

FIG. 5(a) is a graph showing the time-varying upper limit of supply power according to the second embodiment. FIG. 5(b) is a graph showing how the supply power (solid line), with restriction of the upper limit, decreases during the steering operation.

According to the control of the second embodiment, the control circuit 13 does not start the output decreasing control at the mere detection of the breakdown of the battery 6. The control circuit 13 starts the output decreasing control only after the application of steering torque of at least the predetermined value, which follows the detection of battery breakdown. In other words, the steering system does not encounter a phenomenon after the battery breakdown that the upper limit of supply power (steering assist force) is already decreased although no steering operation was done. When the driver performs the first steering operation after the battery breakdown, therefore, the steering system can prevent the driver from experiencing the feeling of strangeness associated with the sudden fall of the steering assist force.

FIG. 1 illustrates the circuit configuration wherein the auxiliary power supply 7 for high voltage output and the auxiliary power supply 8 as the backup power source are connected in series such that the series combination of the power supplies may supply the electric power in the event of a battery breakdown. However, there may also be made an alternative circuit configuration which includes only one of the auxiliary power supplies. In a circuit configuration including only the auxiliary power supply 8 as the backup power source, for example, the MOS-FET 10 may be turned on and the output decreasing control may be provided on the energy stored in the auxiliary power supply 8 just as in the foregoing embodiments. In a circuit configuration including only the auxiliary power supply 7 for high voltage output, the output decreasing control may be performed on the energy stored in the auxiliary power supply 7 just as in the foregoing embodiments. However, the latter configuration requires a switch which is adapted to ground the electrical conduction path L1 connected to one end of the auxiliary power supply 7 in the event of the battery breakdown.

Figure 6:
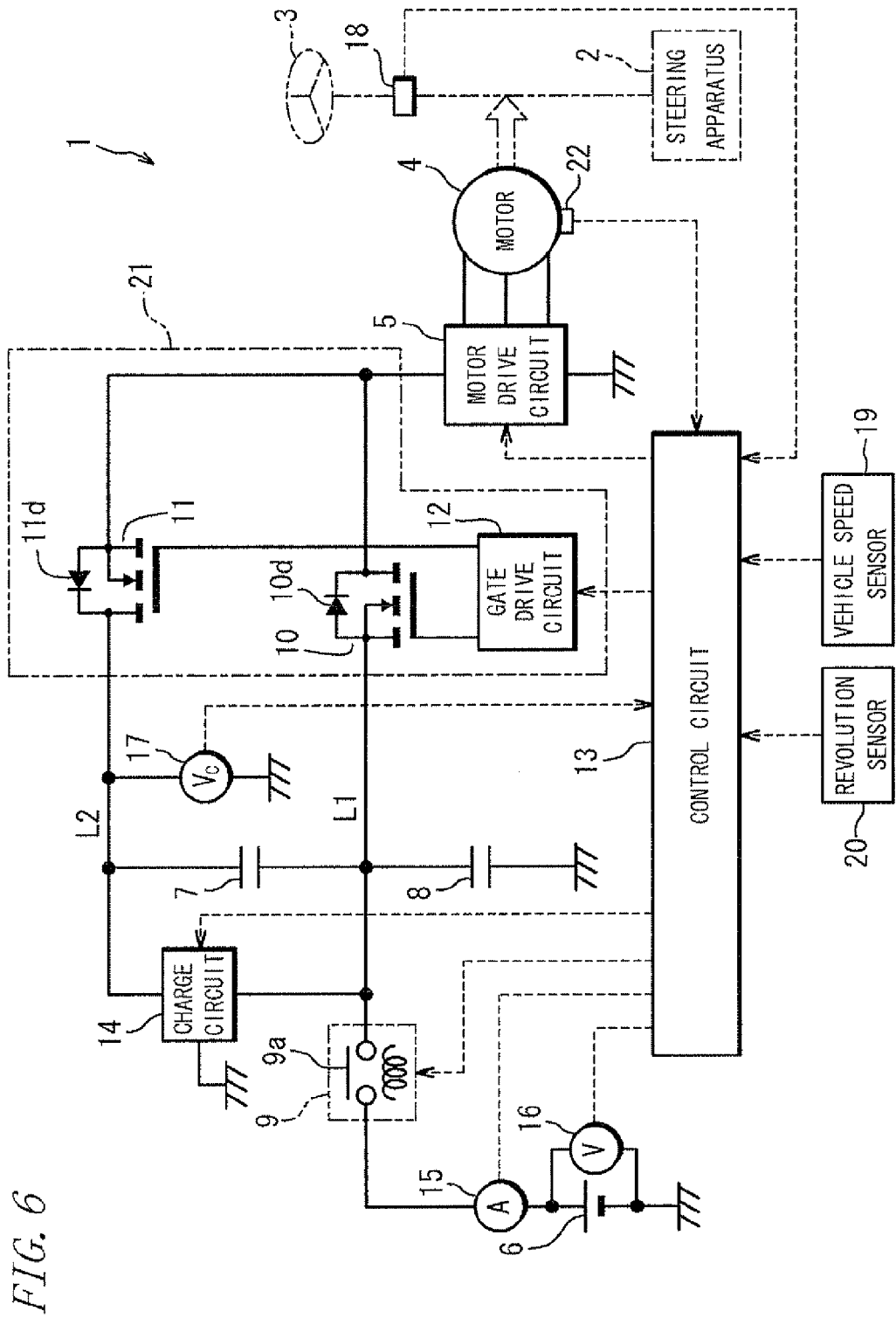
FIG. 6 is a circuit diagram principally showing an electric circuit of a general arrangement of an electric power steering apparatus according to a third embodiment hereof.

FIG. 6 is a circuit diagram principally showing an electric circuit of a general arrangement of an electric power steering apparatus according to a third embodiment of the invention. This circuit diagram differs from that of FIG. 1 in that an output signal from a sensor 22 for detecting the revolutions of the motor 4 is applied to the control circuit 13. Except for this, this circuit is configured the same way as that of FIG. 1. The sensor 22 may employ a revolving angular sensor intrinsically provided in the brushless motor.

Figure 7:
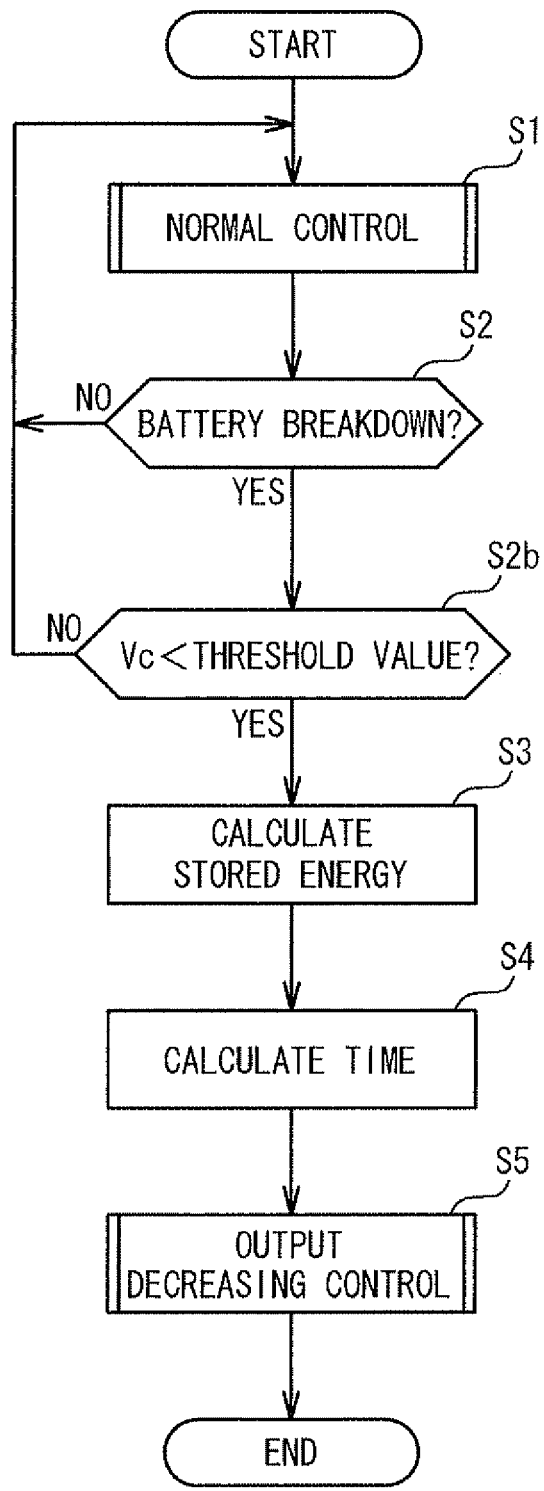
FIG. 7 is a flow chart showing the steps of a control operation of the electric power steering apparatus according to the third embodiment hereof.

FIG. 7 is a flow chart showing the steps of a control operation of the electric power steering apparatus 1 according to the third embodiment. Referring to the figure, the control circuit 13 repeats the normal control till the breakdown (failure) of the battery 6 is detected (Steps S1, S2). In a case where the breakdown of the battery 6 is detected by the control circuit 13 in Step S2, the control circuit 13 first determines whether a voltage $V_c$ detected by the voltage detector 17 is less than a predetermined threshold value or not (Step S2b). If the detected voltage is equal to or more than the threshold value, the operation of the control circuit returns to Step S1 to carry on the normal control. In spite of the breakdown of the battery 6, the normal control is carried on if the voltage Vc is equal to or more than the threshold value. Thus is achieved the effective use of the energy stored in and available from the auxiliary power supplies 7 and 8.

Figure 8:
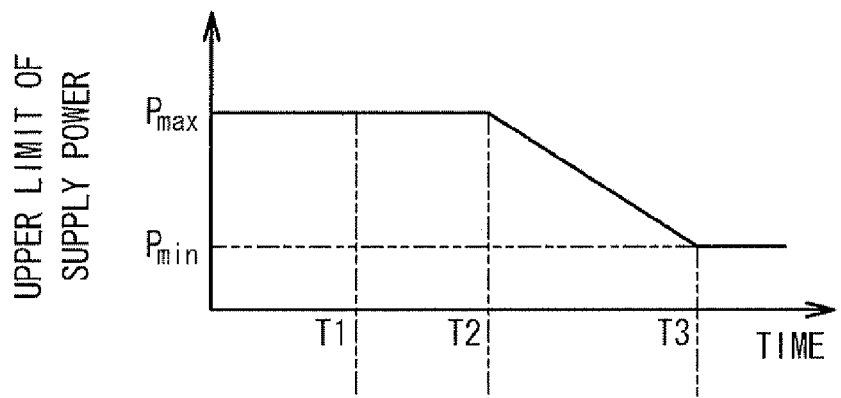
FIG. 8($a$), FIG. 8($b$) and FIG. 8($c$) are graphs respectively showing how the upper limit of supply power, the upper limit of steering assist force and the voltage Vc according to the third embodiment hereof vary after battery breakdown.
Figure 8:
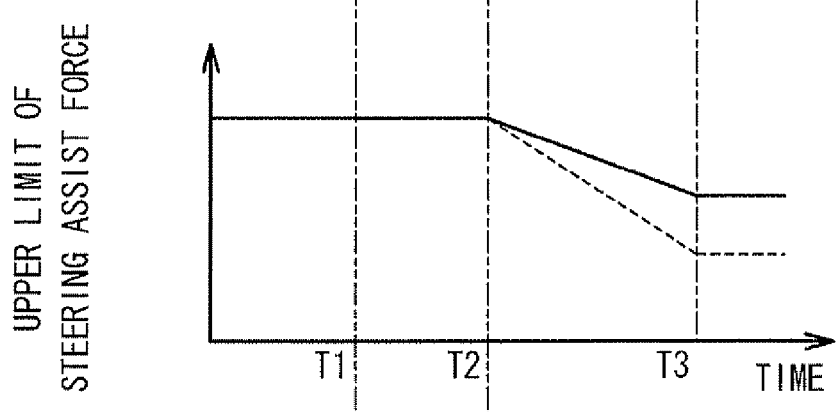
Figure 8:
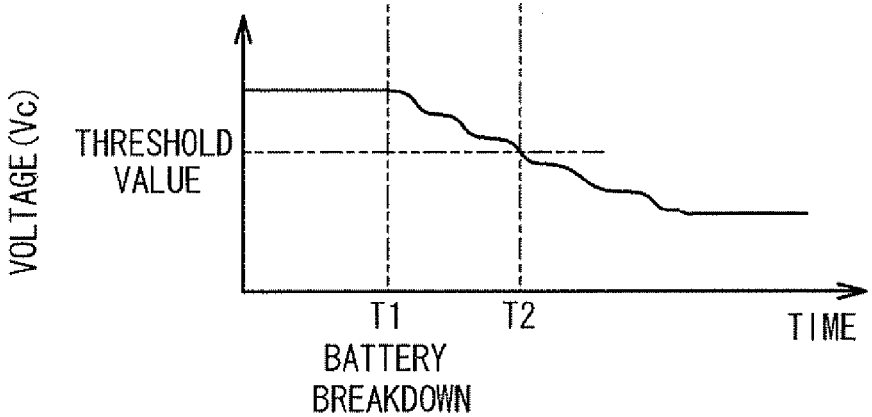

FIG. 8(a), FIG. 8(b) and FIG. 8(c) are graphs respectively showing how the upper limit of supply power, the upper limit of steering assist force and the voltage Vc vary after battery breakdown. As shown in FIG. 8(c), the voltage Vc progressively decreases if the energy stored in the auxiliary power supplies 7 and 8 is used after time T1 when the battery breaks down. As long as the voltage Vc is above the threshold value, however, the restriction is not imposed on the upper limit of the power supplied to the motor 4 nor the upper limit of the steering assist force. Namely, the upper limit of the power supplied to the motor 4 stays at $P_{max}$ until the voltage Vc falls below the threshold value, which is reached at time T2.

On the other hand, if it is determined in Step S2b of FIG. 7 that the voltage Vc is less than the threshold value (after time T2), the control circuit 13 calculates a stored energy (Step S3). Specifically, the stored energy E is calculated by the aforementioned equation (1).

On the other hand, provided that $P_{max}$[W] denotes the maximum power (constant) to be supplied to the motor 4 as defined by the specifications of the electric power steering apparatus 1 and td[sec] denotes the time in which the upper limit of supply power is gradually decreased according to the constant gradient (hereinafter, referred to as "decreasing time"), the following equation is established:

$$E=(P_{max}-P_{min})\cdot(td/2) \qquad (5)$$

It is noted here that $P_{min}$ denotes the minimum value which is set to zero in the first embodiment but is not limited to zero in this embodiment. The minimum value of this embodiment may take any possible value to be set as the minimum value of the upper limit of supply power.

The decreasing time td can be calculated from the following equation obtained by combining the above equations (1) and (5):

$$td=2E/(P_{max}-P_{min})=(C/(P_{max}-P_{min}))(V1^2-V2^2) \qquad (6)$$

Thus, the control circuit 13 calculates a decreasing time td according to the equation (6) (Step S4). Subsequently, the control circuit 13 performs the output decreasing control (Step S5). Specifically, the control circuit 13 provides the control of steering assist (assist control) by turning on the MOS-FET 11 (turning off the MOS-FET 10) and turning off the source relay 9. However, the restriction is imposed on the supply power, so that the upper limit thereof is gradually decreased. Namely, the upper limit P of the supply power is gradually decreased according to the constant gradient such as to establish the following equation:

$$P = P_{max} - ((P_{max} - P_{min})/td) \cdot t \qquad (7),$$

where $t(\leq td)$ denotes the length of time that has elapsed since T2. If t=td, namely at time T3, $P=P_{min}$ which means that the upper limit of the supply power takes the minimum value.

If the supply power is the same, different steering speeds require different steering assist forces. The supply power P is basically determined by the following equation:

$$P = Tm \cdot N \qquad (8),$$

where Tm denotes the motor torque, and N denotes the revolutions of the motor. The higher the steering speed, the smaller the motor torque Tm. This dictates the need to increase pace at which the upper limit of the motor torque is gradually decreased. Conversely, the slower the steering speed, the greater the motor torque Tm, so that the pace at which the motor torque is gradually decreased can be slowed down. The revolutions of the motor are determined based on the output signal from the sensor 22 of the motor 4 (pulse signal serving as a basis for counting the revolutions). The upper limit of the steering assist force is gradually decreased according to the gradient corresponding to the steering speed.

Referring FIG. 8(b), the upper limit of the steering assist force can be gradually decreased according to the gradient indicated by the solid line in the figure in a case where, for example, the steering speed is relatively low, namely the motor speed is relatively low. In a case where the steering speed is relatively high, namely the motor speed is relatively high, the upper limit of the steering assist force can be gradually decreased according to the gradient indicated by the broken line in the figure.

After the breakdown of the battery 6 is detected, the electric power steering apparatus 1 of the third embodiment can operate on the auxiliary power supplies 7 and 8 to provide the steering assist. The upper limit of the supply power at this time is not limited if the energy stored in the auxiliary power supplies 7 and 8 (voltage Vc) is on or above the threshold value. After the stored energy is reduced to below the threshold value, the upper limit of the supply power is gradually decreased according to the length of time elapsed. Similarly to the first and second embodiments, this embodiment provides the electric power steering apparatus which is adapted to prevent the sudden fall of the steering assist force while effectively utilizing the available stored energy.

The above embodiments may preferably be so arranged as to give warning to a driver (e.g., turning on a warning lamp or voice-warning system) in the event of the battery breakdown.

The circuit shown in FIG. 1 or FIG. 6 may adopt, for example, CAN Protocol for transmitting and receiving signals through the signal lines indicted by the broken lines.

The invention claimed is:

1. An electric power steering apparatus driving a motor to generate a steering assist force according to a steering torque, comprising:
   a battery for supplying electric power to the motor;
   an auxiliary power supply charged by the battery and capable of supplying electric power to the motor;
   an output circuit for supplying the motor with electric power from at least one of the battery and the auxiliary power supply;
   a breakdown detector for detecting a breakdown of the battery; and
   a control circuit which, in the event of a battery breakdown detected by the breakdown detector, uses the stored energy of the auxiliary power supply for steering assist and performs output decreasing control to gradually decrease an upper limit of a power supplied for the steering assist according to a length of time elapsed, the control circuit calculating available energy presently stored in the auxiliary power supply after the battery breakdown and determining a length of time to the end of the steering assist based on the amount of energy stored in the auxiliary power supply to thereby perform the output decreasing control until the length of time has elapsed.

2. The electric power steering apparatus according to claim 1, wherein at or after the battery breakdown detected by the breakdown detector, the control circuit performs the output decreasing control defined as that the upper limit of the power supplied for the steering assist is gradually decreased to practically zero according to a constant gradient.

3. The electric power steering apparatus according to claim 1, wherein when a steering torque of at least a predetermined value is first applied at or after the battery breakdown detected by the breakdown detector, the control circuit performs the output decreasing control defined as that the upper limit of the power supplied for the steering assist is gradually decreased to practically zero according to a constant gradient.

4. The electric power steering apparatus according to claim 1, wherein the control circuit performs the output decreasing control when the amount of energy stored in the auxiliary power supply falls below a threshold value at or after the battery breakdown detected by the breakdown detector.

* * * * *